US012805669B2

(12) United States Patent
Mader

(10) Patent No.: US 12,805,669 B2
(45) Date of Patent: Nov. 24, 2026

(54) HANDLE ELEMENT FOR RELEASABLE FASTENING TO A COOKING VESSEL

(71) Applicant: COOKVISION GMBH, Haan (DE)

(72) Inventor: Sebastian Mader, Hilden (DE)

(73) Assignee: COOKVISION GMBH, Haan (DE)

(*) Notice: Subject to any disclaimer, the term of this patent is extended or adjusted under 35 U.S.C. 154(b) by 980 days.

(21) Appl. No.: 17/797,550

(22) PCT Filed: Feb. 1, 2021

(86) PCT No.: PCT/DE2021/100094
§ 371 (c)(1),
(2) Date: Aug. 4, 2022

(87) PCT Pub. No.: WO2021/155884
PCT Pub. Date: Aug. 12, 2021

(65) Prior Publication Data
US 2023/0144104 A1 May 11, 2023

(30) Foreign Application Priority Data
Feb. 4, 2020 (DE) ..................... 10 2020 102 770.2

(51) Int. Cl.
*A47J 45/07* (2006.01)

(52) U.S. Cl.
CPC .................................. *A47J 45/071* (2013.01)

(58) Field of Classification Search
CPC .. A47J 45/00; A47J 45/02; A47J 45/07; A47J 45/071; A47J 45/10
See application file for complete search history.

(56) References Cited

U.S. PATENT DOCUMENTS 13,920 A * 12/1855 Tubbs ...................... B26D 3/02 83/459
217,668 A * 7/1879 Merritt ..................... B25G 3/22 279/42

(Continued)

FOREIGN PATENT DOCUMENTS

CN 101157402 A 4/2008
CN 103996982 A 8/2014

(Continued)

OTHER PUBLICATIONS

Annex to the German Office Action Dated Jun. 5, 2020, 1 Page.
Annex of Chinese Office Action of Mar. 31, 2025, as well as Feb. 10, 2026. 2 pages.

*Primary Examiner* — Bao-Thieu L Nguyen
(74) *Attorney, Agent, or Firm* — LUCAS & MERCANTI, LLP; Klaus P. Stoffel

(57) ABSTRACT

A handle element for releasable fastening to a cooking vessel, including a carrying body, on which a claw provided by a single-armed lever is arranged, wherein: a clamping-surface pair with a first clamping surface on the carrying body and with a second clamping surface on the claw is provided. The claw can be pivoted between an open position, in which the two clamping surfaces are spaced apart from one another, and a closed position, in which the two clamping surfaces are in close proximity to one another. A closing lever is provided on the carrying body. The closing lever is connected to the claw via a tension rod and includes a control cam, which, as a result of the closing lever being displaced from a not-in-use position into an in-use position, causes the claw to be displaced from its open position into its closed position.

21 Claims, 7 Drawing Sheets

(56) References Cited

U.S. PATENT DOCUMENTS

| | | | | | |
|---|---|---|---|---|---|
| 606,904 | A * | 7/1898 | Rice | A47J 45/10 | 220/759 |
| 1,253,928 | A * | 1/1918 | Brammar | A47J 45/10 | 294/34 |
| 1,282,246 | A * | 10/1918 | Bernath | A47J 45/10 | 15/164 |
| 1,338,065 | A * | 4/1920 | Bernath | A47J 45/10 | 294/31.1 |
| 1,677,251 | A * | 7/1928 | Saffold | B62D 55/32 | 72/452.2 |
| 2,031,770 | A * | 2/1936 | Gilbert | A47J 44/02 | 366/199 |
| 3,192,820 | A * | 7/1965 | Pitzer | F16B 13/065 | 279/2.12 |
| 3,709,088 | A * | 1/1973 | Pitzer | F16B 19/1063 | 411/70 |
| 5,156,508 | A * | 10/1992 | Grisley | B25B 5/08 | 411/432 |
| 5,177,823 | A * | 1/1993 | Riach | A61G 15/125 | 5/636 |
| 5,531,551 | A * | 7/1996 | Bowers | F16B 19/1045 | 24/607 |
| 5,752,860 | A * | 5/1998 | Greaves | H01R 4/44 | 439/100 |
| 5,826,365 | A * | 10/1998 | Stroobants | A01K 91/08 | 43/4.5 |
| 5,979,104 | A * | 11/1999 | Walker | A01K 91/08 | 43/43.12 |
| 6,000,739 | A * | 12/1999 | Zemit | A47J 45/10 | 15/236.08 |
| 6,341,714 | B1 * | 1/2002 | Bogani | A47J 45/071 | 220/759 |
| 7,497,489 | B2 | 3/2009 | Baughman | | |
| 9,360,037 | B2 * | 6/2016 | Wang | F16B 5/0642 | |
| 10,813,485 | B2 * | 10/2020 | Peabody | A47G 25/08 | |
| 11,084,234 | B2 * | 8/2021 | Stull | B29C 73/066 | |
| 2007/0187881 | A1 * | 8/2007 | Dixon | B25B 5/08 | 269/236 |
| 2019/0175228 | A1 * | 6/2019 | Elimelech | A61B 17/122 | |

FOREIGN PATENT DOCUMENTS

| | | | |
|---|---|---|---|
| CN | 106983404 | A | 7/2017 |
| CN | 208447376 | U | 2/2019 |
| DE | 202015001953 | U1 | 3/2015 |
| EP | 1378135 | B1 | 12/2012 |
| EP | 2941988 | A1 | 11/2015 |
| FR | 2818885 | A1 | 7/2002 |
| JP | 2001190432 | A | 7/2001 |

* cited by examiner

HANDLE ELEMENT FOR RELEASABLE FASTENING TO A COOKING VESSEL

CROSS-REFERENCE TO RELATED APPLICATIONS

The present application is a 371 of International application PCT/DE2021/100094, filed Feb. 1, 2021, which claims priority of DE 10 2020 102 770.2, filed Feb. 4, 2020, the priority of these applications is hereby claimed and these applications are incorporated herein by reference.

BACKGROUND OF THE INVENTION

The invention relates to a handle element for releasable attachment to a cooking vessel, e.g., to a saucepan.

Such handle elements have been sold by the applicant for some time.

In this context, the company B/R/K Vertriebs-GmbH, which is linked to the applicant, has in particular for several years sold a handle element, not verifiable by documentation, which is based on a handle element described in EP 1378135 B1. Said document describes a handle element comprising a support body and a two-arm lever. The two-arm lever is pivotably mounted on the support body. A clamping face is arranged on the one lever arm of the two-arm lever. A closing lever is arranged on the other lever arm of the two-arm lever. The closing lever can be transferred from an open position, as shown for example in FIG. 3 of the aforementioned publication, to a closed position (see FIG. 5 of the publication), thereby spacing the free end of the second lever arm of the closing lever apart from the support body and at the same time clamping the clamping faces together on the other side of the pivot joint.

The aforementioned handle element has proved its worth in use. However, some disadvantages have come to light. In particular, for reasons that are not entirely clear, the plastic bearings occasionally pull out and break.

SUMMARY OF THE INVENTION

On this basis, the problem addressed by the invention is that of improving the already known handle element.

The handle element according to the invention can be long-handled in design or can be designed as a hand grip or as a short handle. In particular, the invention encompasses that one or two handle elements, optionally also more handle elements, are releasably attached to a cooking vessel.

The cooking vessel to which a handle element as described in the invention is to be affixed can be a conventional metal saucepan, for example. In particular, the invention encompasses that the cooking vessel is a tapered saucepan provided with an approximately horizontal edge. Such saucepans that are designed with conical walls can in particular be stacked in a space-saving manner and can be stored in a space-saving manner.

The handle element according to the invention can be affixed to, for example, a horizontal wall section, a saucepan edge. The invention also encompasses that the locating surface for the handle element on the saucepan is not horizontal in form but instead assumes a different spatial form, for example a vertical orientation, or a spatially inclined form.

In accordance with the invention, the handle element comprises a support body. The support body can in particular be designed from plastic and can be designed ergonomically for engagement by a human hand. A claw is arranged on the support body. In accordance with the invention, said claw is provided by a single-arm lever.

The handle element according to the invention comprises a pair of clamping faces:

Said pair is constituted of a first clamping face, which is provided on the support body, and a second clamping face, which is provided on the claw. The second clamping face can be moved relative to the first clamping face, towards it or away from it, as a result of a displacement of the claw. The claw can be restricted in the opening direction in respect of its opening movement by a stop face.

The claw is pivotable between an open position and a closed position. In the open position, the two clamping faces are spaced apart from each other. In the closed position of the claw, the two clamping faces are closer together.

When the claw is in the closed position, the pair of clamping faces can make secure contact with the corresponding engagement faces on the cooking vessel, i.e., in particular on the horizontally formed edge of the pan, and clamp the edge between them in this way.

In other words, when the claw is in the closed position, the handle element is securely affixed to the pan.

In order to be able to pivot the claw, a closing lever is provided. The closing lever is arranged on the support body, in particular so as to be pivotable with respect thereto. According to an advantageous embodiment of the invention, the closing lever is arranged in an overhanging manner on the support body. This is described further on in greater detail.

In accordance with the invention, the closing lever is connected to the claw by way of a tie-rod. The tie-rod is capable of exerting tensile forces on the claw.

Moreover, a control cam is provided on the closing lever. When the closing lever is displaced from a non-usage position into its usage position, the control cam causes the claw to be displaced from its open position into its closed position.

In accordance with the invention, a control cam is provided which has a cam face or control cam face. The cam face enables a tensile force to be exerted on the claw.

The closing lever is pivotably mounted with its cam control face in particular on the support body, in such a way that the cam control face is supported on a counter-control face which is fixedly arranged on the support body. The counter-cam face thus forms a kind of abutment or abutment face for the cam control face.

A movement of the closing lever causes the cam to turn at the same time. In particular, the cam is eccentrically formed. The tie-rod is in particular mounted for rotation on the control cam. A displacement of the closing lever causes the relative position of the rotary axis of the cam to change with respect to the abutment face. A lift is thus applied to the end of the tie-rod mounted in the cam. This lift is converted by the tie-rod into a tensile force on the claw.

Through the structure proposed in accordance with the invention, using a tie-rod, the actuation torques absorbed by the closing lever can be introduced directly into the claw. In this way, the bearing faces can be enlarged, the torques and forces to be transmitted can be optimized, and the handle element can be securely clamped to the edge of the pan.

The special feature of a second embodiment of the invention lies with the fact that the claw consists of metal. In the prior art according to the document described at the start, both the support body and the clamping arrangement formed by a two-arm lever are formed of plastic.

A significantly increased fire resistance can be achieved with the inventive embodiment of the claw. In particular, in applications for saucepans for gas stoves or other cooking vessels operated on open flames, a handle element according to the invention can meet higher safety requirements.

At the same time, the other elements of the handle element, in particular the support body, but also, for example, the closing lever and an opening lever that is optionally to be provided, can be formed of plastic. This allows for an ergonomic and haptically optimized design of a handle element along with low production costs and design advantages.

The principle of a third embodiment of the invention lies substantially with the fact that a spring element is provided. This biases the two clamping faces into their spaced-apart position. The clamping element can be arranged directly between the pair of clamping faces, for example. The invention can also encompass that the spring element is arranged in the effect chain at any point between the pair of clamping faces. It can also be provided in accordance with the invention that the spring element is arranged in the effect chain between the closing lever and the second clamping face. Advantageously, the spring element can be designed as a helical spring element which surrounds the tie-rod.

The arrangement in accordance with the invention of a spring element allows for a tolerance compensation.

The wall thicknesses of the cooking vessels can vary due to production reasons. The spring element can absorb these tolerances and, within predefined ranges, of up to two-tenths of a millimeter, for example, depending on the design and interpretation of the spring element, bring about a tolerance compensation.

Furthermore, the spring element provides a balancing out and stabilization of the pressing forces.

In accordance with the invention, the pair of clamping faces is constructed and dimensioned in such a way that, in particular, when the closing lever is in the closed position or when the claw is in the closed position, the pair of clamping faces receives the edge of the pan with a certain play. The spring element operates within this receiving play and provides for a secure fit of the two clamping faces on the edge of the pan or on the engagement faces arranged on the edge of the pan and for a balancing out and homogenization of the forces. Through the choice of the spring element and the choice of the spring constant, these forces can be adjusted and predetermined precisely and reliably.

The special feature of a fourth embodiment of the invention lies with the fact that a closing mechanism is provided, which includes a closing lever. As integral part of the closing mechanism, there is further provided an opening lever, which can cooperate with the closing lever. By actuating the opening lever, an opening movement of the closing lever can be initiated. The opening lever can be pivotably mounted on the closing lever, for example. The opening lever can also have a graspable or grippable actuating element, for example, or an actuating extension that is easily engageable by an operator. Furthermore, it can have control faces which allow for an easier opening movement of the closing lever.

The invention also encompasses that the opening lever does not only provide for an initiation of the opening lever and the closing lever but can transfer the closing lever fully into its open position. The aforementioned spring element can likewise play a supportive part in this opening movement of the closing lever.

In accordance with an advantageous embodiment of the invention, the spring element is arranged on the tie-rod or is associated with the tie-rod. The spring element can particularly advantageously be provided by a helical spring, which surrounds the tie-rod. In this way, firstly, the spring element can be attached in a particularly simple manner, namely directly to the tie-rod. Secondly, use can be made of commercially available components to provide a spring element.

According to a further advantageous embodiment of the invention, the support body consists of plastic.

According to a further advantageous embodiment of the invention, the closing lever consists of plastic.

According to a further advantageous embodiment of the invention, the opening lever consists of plastic.

It is thus possible for all of the parts or a plurality of the parts of the handle element that are grasped by an operator's hand to be provided with an ergonomically formed surface and/or with a surface that is particularly appealing to touch.

According to a further advantageous embodiment of the invention, the tie-rod is mounted in a rotary bearing so as to be pivotable relative to the closing lever. The rotary bearing, which in particular is made of metal, can be provided by a bolt or pin, for example. This is accommodated in an internal cutout of the cam. The tie-bolt or tie-rod is thus arranged so as to be pivotable relative the cam and hence also pivotable relative to the closing lever.

According to a further advantageous embodiment of the invention, the rotary bearing can be retained axially in relation to the support body, providing a radial clearance. In this way, a defined axial position of the closing lever relative to the support body and at the same time a defined axial position of the rotary bearing relative to the support body can be provided, regardless of the pivoted position of the closing lever. At the same time, the radial clearance can allow for a lifting movement of the rotary bearing relative to the base of the support body or relative to the abutment. To this end, the control cam has an eccentric cam face, which provides different radial positions of the rotary bearing relative to the abutment of the support body in different pivoted positions of the closing lever.

At the same time, this embodiment allows for a particularly simple design of a handle element according to the invention.

According to an advantageous embodiment of the invention, the control cam consists of plastic. Furthermore, a counter-cam face can be provided, which in particular provides an abutment for the control cam. The counter-cam face or the abutment can advantageously consist of metal. An abrasion that might otherwise arise in long-term use can be avoided in this way.

According to a further advantageous embodiment of the invention, the claw has an extension. The extension can have a abutment face which comprises a curvature that approximates to a curvature of the wall of the pan. A particularly good and secure, optimized fit of the handle element on the cooking vessel can be achieved in this way.

According to a further advantageous embodiment of the invention, the support body includes an cutout. When the closing lever is hi the closed position, it can fit flush into the cutout. A particularly ergonomic embodiment of the handle element can be achieved in this way. In particular, when the handle element is in the usage position, i.e., when the handle element is attached to the cooking vessel, a secure handling of the handle element and the cooking vessel can be achieved without the need for any projections.

According to a further advantageous embodiment of the invention, the tie-rod abuts on the claw at a distance of more than two-thirds of the distance between the pivot axis of the claw and the second clamping face. A particularly good transmission of force is achieved in this way, enabling a high clamping force to be achieved with low actuating and operating forces.

According to a further advantageous embodiment of the invention, the opening lever is pivotably mounted on the closing lever. This allows for a particularly simple design of a handle element according to the invention.

According to a further advantageous embodiment of the invention, the closing lever is mounted in an overhanging manner on the support body. This likewise allows for a particularly simple design and construction of the handle element according to the invention.

The overhanging mounting of the closing lever on the support body along with the overhanging mounting of the tie-rod on the support body allows for an axial retention but a radial clearance. A particularly simple design and assembly of the handle element according to the invention can be achieved in this way.

BRIEF DESCRIPTION OF THE DRAWING

Further advantages of the invention can be found in the dependent claims that are not cited and in the exemplary embodiments of the invention presented in the figures, as follows:

In the figures.

DETAILED DESCRIPTION OF THE INVENTION

Figure 1:
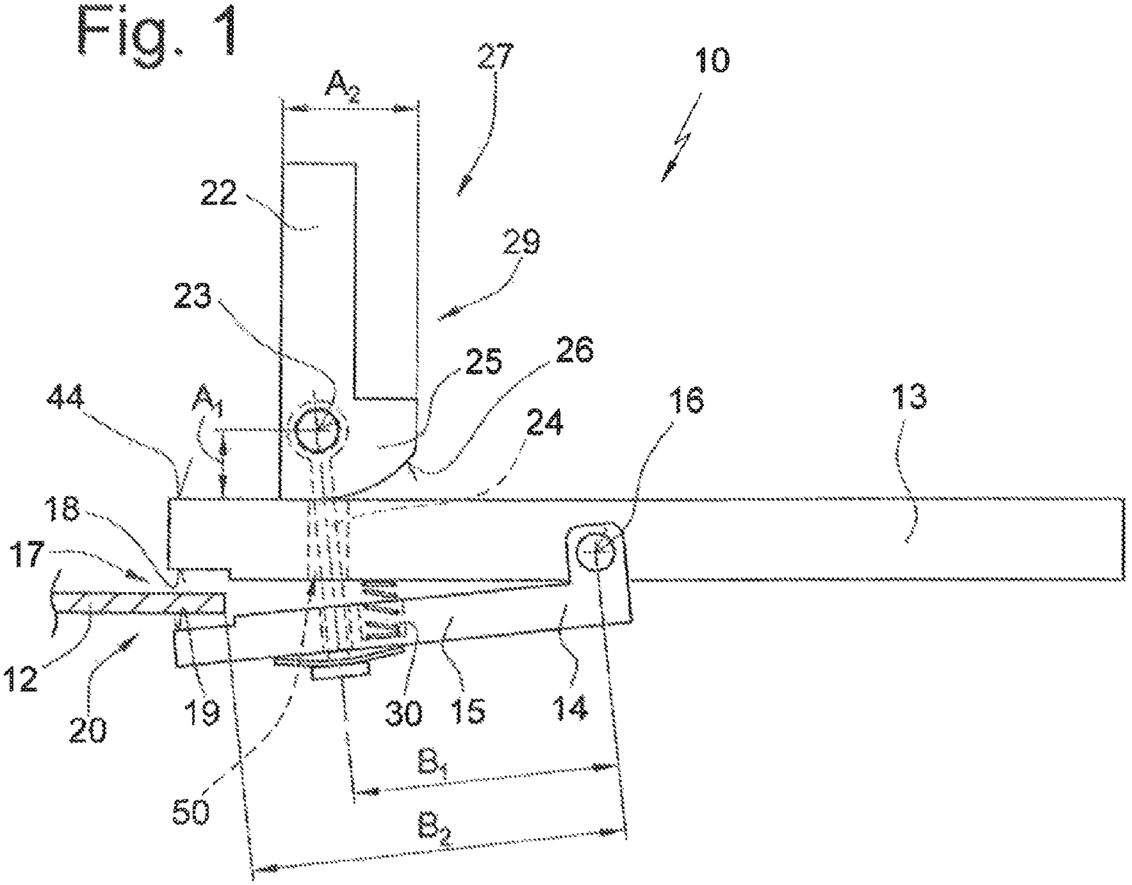
FIG. 1 shows in a partial sectional schematic outline sketch, a first exemplary embodiment of the handle element according to the invention, in longitudinal section.

Exemplary embodiments of the invention are described by way of example in the following description of the figures, making reference also to the drawings. For the sake of clarity, including where different exemplary embodiments are concerned, the same or comparable parts or elements or regions are identified by the same reference characters, in some cases with the addition of lower case letters.

Within the scope of the invention, features that are described, presented or disclosed only in relation to one exemplary embodiment can also be provided in any other exemplary embodiment of the invention. Exemplary embodiments that are modified in such a way, even if they are not shown in the drawings, are encompassed by the invention.

All disclosed features are essential to the invention in their own right. The disclosed content of the associated priority documents (copy of the previous application) and of the cited publications and of the described prior art devices is hereby included in its entirety in the disclosure of the application, including for the purpose of incorporating individual or multiple features of the subject matter disclosed therein in one or more claims of the present application. Such modified exemplary embodiments, even if they are not shown in the drawings, are also encompassed by the invention.

Figure 2:
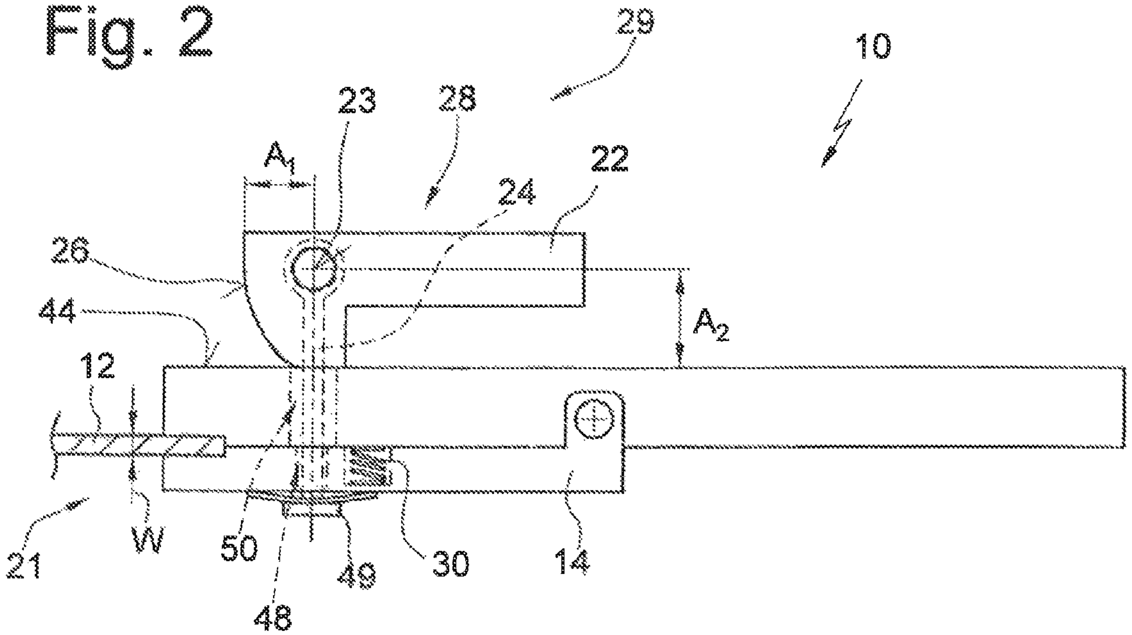
FIG. 2 shows the exemplary embodiment of FIG. 1 with the claw in the closed position.

A first exemplary embodiment of the handle element denoted in its entirety in the drawings by reference character 10 will now be described by reference to FIGS. 1 and 2:

FIG. 1 shows the handle element with a clamping face pair 17 in the open position 20 and FIG. 2 shows the handle element 10 of FIG. 1 with the clamping face pair in the closed position 21.

As shown in FIG. 2, the handle element 10 grips an edge 12 of a cooking vessel 11 by its clamping faces 18 and 19.

Figure 3:
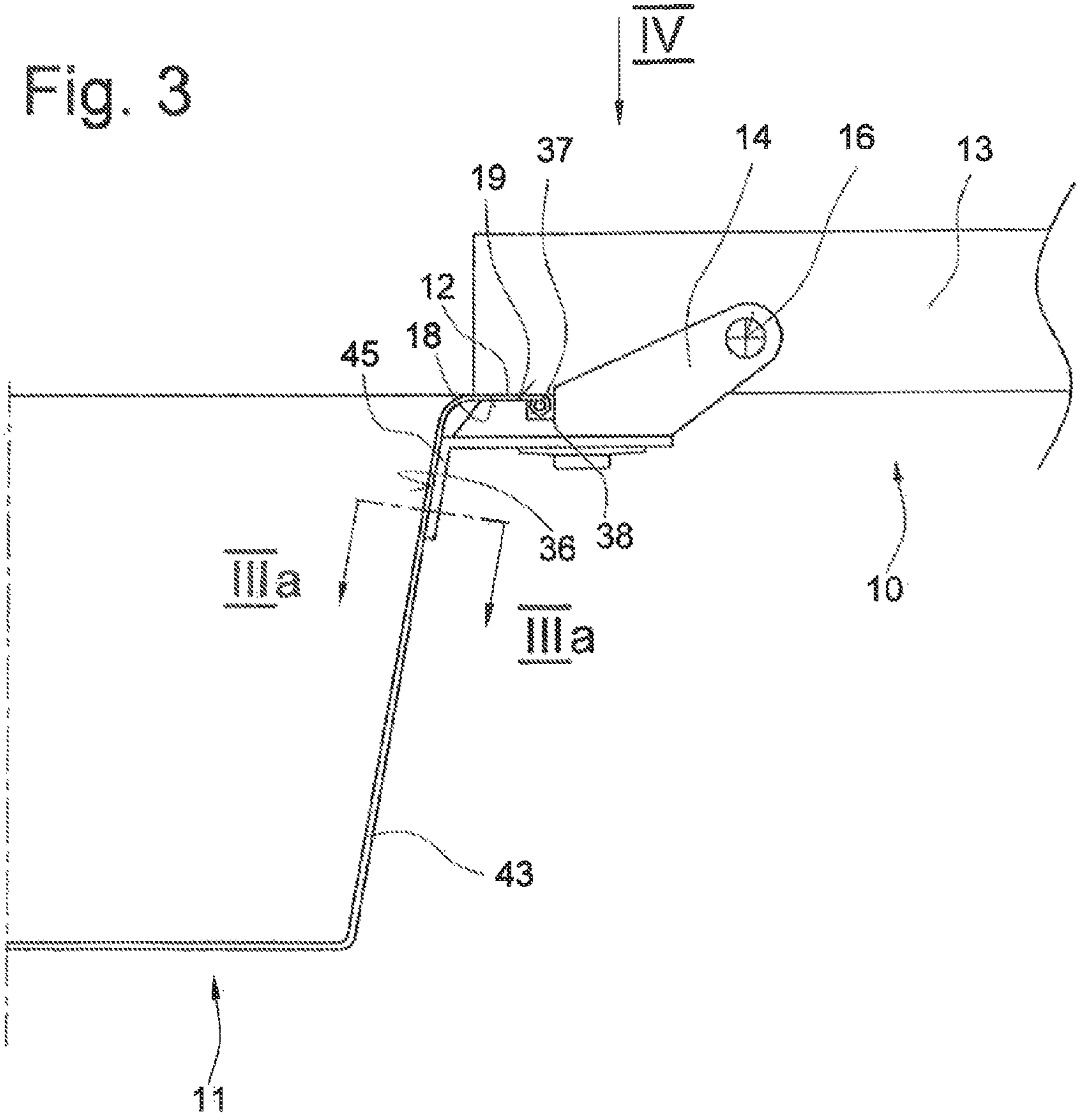
FIG. 3 shows a further exemplary embodiment of a handle element according to the invention with a claw in the closed position and clamped to an edge region of a saucepan.

The cooking vessel 11 is illustrated schematically in its entirely in FIG. 3: it can be seen that a wall 43 extends conically, for example, away from a base of the cooking vessel. As shown in FIGS. 1 through 3, the edge 12 of the cooking vessel 11 is arranged substantially horizontally.

The invention also encompasses handle elements not shown in the figures, in which the wall region of the cooking vessel 11, to which the handle element 10 can attach, has a different geometric extent and in particular is not horizontally formed.

As shown in FIG. 3, the free edge 12 of the cooking vessel 11 is provided with a flange 37. An cutout 38 can be arranged on the claw 14 to receive the flange. However, the invention also encompasses handle elements that allow the handle element 10 to be affixed to a smooth, i.e., with no flange 37, edge region 12 of the cooking vessel 11.

The construction and operating principle of an exemplary embodiment of the handle element 10 will now be described in accordance with the outline sketches of FIGS. 1 and 2:

According to FIGS. 1 through 3, the handle element 10 is designed as a handle stem or as an elongated handle element 10. As shown in FIGS. 1 and 2, it comprises a support body 13, which can consist of plastic, for example, and provides the actual stem. A claw 14 is arranged on the support body 13 so as to be pivotable about a pivot axis 16. While the support body 13 can consist of plastic, the claw 14 advantageously consists of metal.

In the exemplary embodiment of FIGS. 1 through 3, the claw 14 is designed as a single-arm lever 15. The invention also encompasses variants in which the claw 14 is formed by a two-arm or multi-arm lever (not shown).

The handle element 10 provides a clamping face pair 17 having a first clamping face 18 and a second clamping face 19. The first clamping face 18 is arranged on the support body 13 and the second clamping face 19 is arranged on the claw 14.

The claw 14 is displaceable between an open position 20 as shown in FIG. 1 and a closed position 21 as shown in FIG. 2.

In the open position 20, the claw 14 can release the edge 12 of the cooking vessel 11, and in the closed position 22, as shown in FIG. 2, the clamping face pair 17 can engage with the edge 12 of the cooking vessel 11 and affix the handle element 10 securely to the cooking vessel 11 in this way.

As shown in FIGS. 1 and 2, the handle element 10 has a closing lever 22.

This is shown in its non-usage position in FIG. 1 and in its usage position in FIG. 2. The closing lever 22 can likewise consist of plastic.

It comprises a control cam 25 with a cam face 26.

A tie-rod 24 is mounted in a rotary bearing 34 in the cam 25. The center of the rotary bearing 34 provides the geometric pivot axis 23. This pivot axis 23 is, firstly, the pivot axis 23 about which the tie-rod 24 is pivotable through a small angular range relative to the control cam 25. At the same time, the pivot axis 23 is the pivot axis about which the closing lever 22 can perform an opening and/or closing movement between its non-usage position 27 as shown in FIG. 1 and the usage position 28 as shown in FIG. 2.

The closing lever 22 along with its cam 25 and the tie-rod 24 together provide a closing mechanism 29. In other exemplary embodiments, the closing mechanism 29 can also include an opening lever 31, which is described in detail further on.

The tie-rod 24 passes through an opening 48 in the claw 14 and is retained on the claw 14 by an expansion portion 49. Moreover, the tie-rod 48 passes through a hole 50 in the support body 13.

As can be seen from the different angular positions of the tie-rod 24 in FIGS. 1 and 2 relative to the support body 13, the hole 50 is sufficiently large to allow a slight pivoting movement of the tie-rod 24 therein.

The cam 25 has a cam control face or cam face 26, which is formed eccentrically. In particular, the cam face 26 is designed in such a way that, when the closing lever 22 is in different relative positions, the rotary axis 23 has different distances $A_1$, $A_2$ from the abutment face 44 on the support body 13, along which abutment face the control cam 25 rolls.

Thus, FIG. 1 clarifies the non-usage position 27 of the closing fever 22, in which the rotary axis 23 is a distance $A_1$ from the abutment 44, and FIG. 2 clarifies the usage position 28 of the closing lever 22, in which the rotary axis 23 is a distance $A_2$, which is greater than the distance $A_1$, from the abutment face 44.

As a result of a pivoting movement of the closing lever 22 from the position shown in FIG. 1 into a position shown in FIG. 2, the pivot axis 23 is thus lifted in relation to the fixed abutment face 44 and pulls the claw 14 with it via the tie-rod 24. This pulling movement corresponds to a closing movement of the claw 14 and hence to a moving together of the clamping faces 18, 19.

A displacement of the closing lever 22 from the non-usage position 27 as shown in FIG. 1 into its usage position 28 as shown in FIG. 2 is thus accompanied by a movement of the claw 14 from its open position 22 as shown in FIG. 1 into its closed position 21 as shown in FIG. 2.

According to the exemplary embodiment of FIGS. 1 and 2, the handle element 10 has a spring element 30. The spring element 30 can be designed as a helical spring 33 for example. In particular, it can be designed to bias the clamping faces 18 and 19 of the clamping face pair 17 into a spaced-apart position.

A tolerance compensation for different wall thicknesses W of the edge 12 of the cooking vessel 11 is thus possible.

If, for example, the wall thickness W of the edge 12 of the cooking vessel 11 is somewhat smaller than shown in FIG. 2, the spring element 30 can provide an adequate contact pressure and thus ensure that the handle element 10 is securely and durably affixed to the cooking vessel 11.

It is noted that FIG. 2 should be understood only schematically in this regard:

In fact, in order for the spring force of the spring 30 to enable an appropriate contact pressure to be achieved, the geometric arrangement of the clamping face pair 17 would have to be somewhat different from that shown: even with smaller wall thicknesses W of the edge 12 of the cooking vessel 11 than shown in FIG. 2, the spring force can cause the clamping faces 18, 19 to move together in a clamping manner.

The exemplary embodiment of FIG. 3 shows a handle element 10 that is slightly different from that shown in FIGS. 1 and 2:

Here it can be seen that the closing lever 22 is fully received inside the contour of the support body 13 and is not visible in FIG. 3.

Figure 3A:
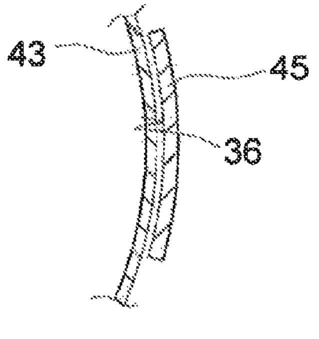
FIG. 3*a* shows in a partial sectional schematic view, a cross-section through an extension of the claw and the pan edge, approximately in accordance with section line IIIA-IIIA in FIG. 3.

Moreover, FIG. 3 makes it clear that the claw 14 can have an extension 45, which approximates to the geometry of the wall 43 of the cooking vessel 11. In particular, the extension 45 of the claw 14 can have a abutment face 36 which, as shown in FIG. 3*a*, approximates to the curvature of the wall 43 of the cooking vessel 11. An improved positioning and retention of the handle element 10 on the cooking vessel 11 can be achieved in this way.

Figure 4:
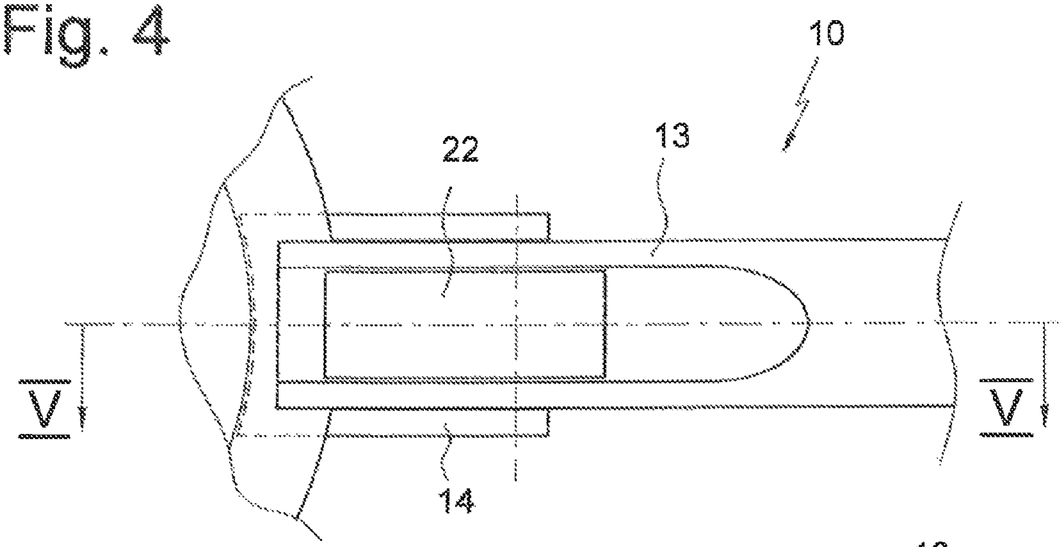
FIG. 4 shows in a partial sectional schematic view, approximately in accordance with view arrow IV in FIG. 3, a part of the handle element and a region of the pan in plan view.
Figure 5:
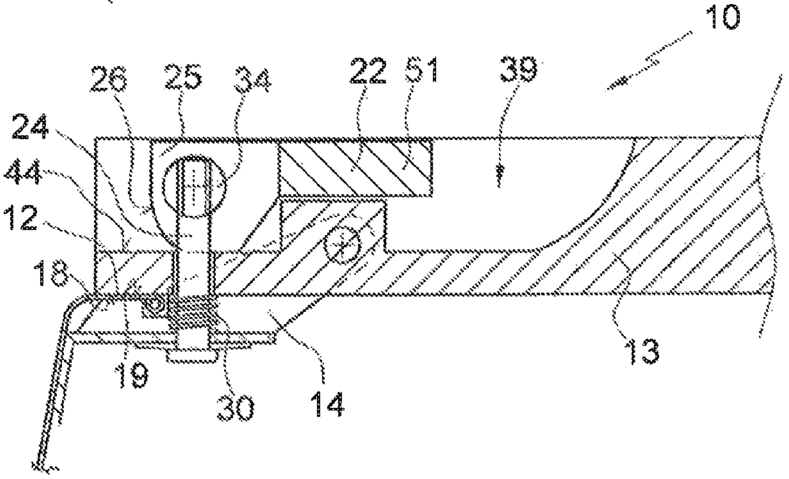
FIG. 5 shows in a partial sectional schematic view, approximately along section line V-V in FIG. 4, a longitudinal section through the handle element and the edge region of the pan, with the claw in the closed position.
Figure 6:
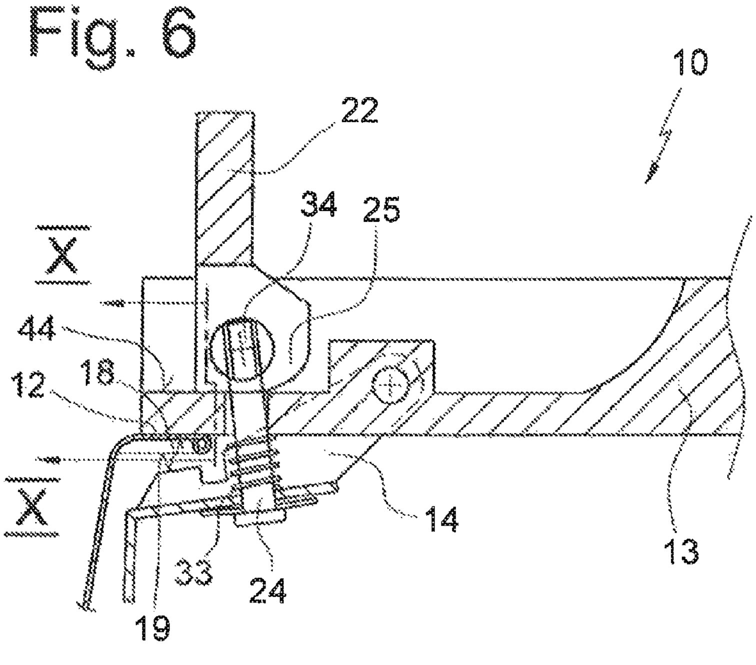
FIG. 6 shows the exemplary embodiment of FIG. 5 with the claw in the open position.

It is clear from the exemplary embodiments of FIGS. 4 through 6 that an cutout 39 can be arranged on the support body 13, which serves to receive the closing lever 22 when in the closed position or usage position 28, in particular such a way that it fits flush in the cutout.

This usage position 28 of the closing lever 22 is shown in FIGS. 4 and 5.

By contrast, FIG. 6 shows the non-usage position 27 of the closing lever 22.

As shown in FIG. 5, the cutout 39 is in particular large enough that an operator can use a recessed finger grip to grasp the free end 51 of the lever 22, i.e., the end that is furthest away from the pivot axis 23 or from the rotary bearing 34, and to transfer the closing lever 22 from the usage position 28 as shown in FIG. 5 into the non-usage position 27 as shown in FIG. 6.

In the exemplary embodiment of FIGS. 5 and 6, a spring element 30 is provided that is different from that shown in FIG. 2:

It is designed as a helical spring 33 and surrounds the tie-rod 24.

When the claw 14 is displaced from the open position as shown in FIG. 6 into the closed position as shown in FIG. 5, the spring element 30, 33 is tensioned. The aim is thus to bias the clamping face pair 7 into a spaced-apart position.

It can be seen from FIGS. 4 and 5 that the control cam 25 also serves to receive a rotary bearing 34. With the aid of the rotary bearing 34, the tie-rod 24 is arranged so as to be pivotable relative to the cam 25.

At the same time, the rotary bearing 34 serves to mount the closing lever 22 in such a way that it is pivotable relative to the support body 13.

Figure 11:
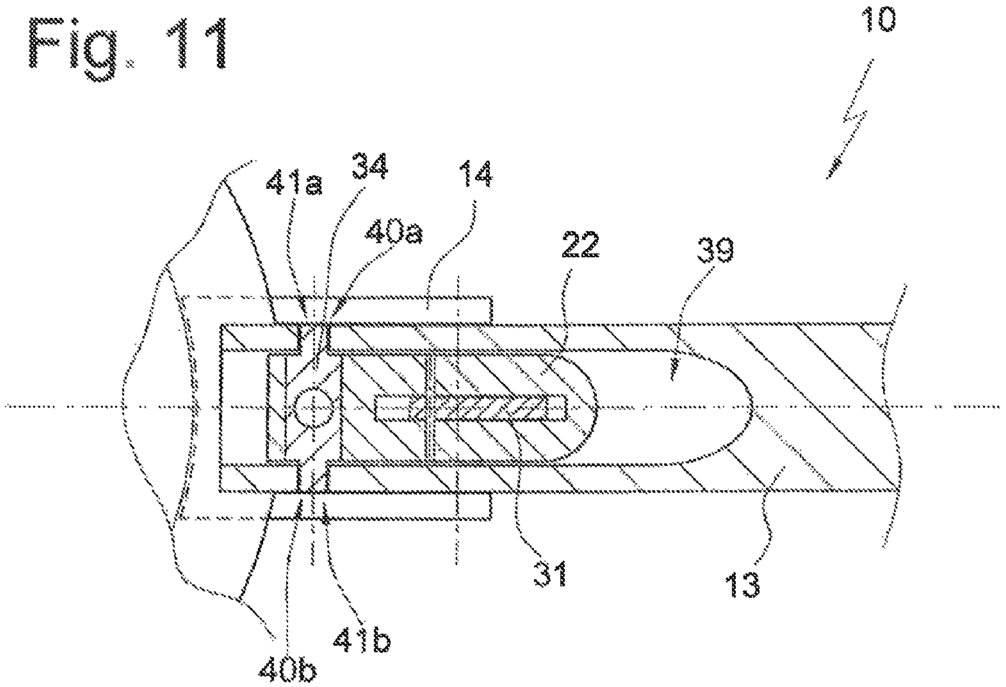
FIG. 11 shows a further exemplary embodiment of a handle element according to the invention in a representation approximately in accordance with section line XI-XI in FIG. 7 in a schematic partial sectional outline sketch.
Figure 12:
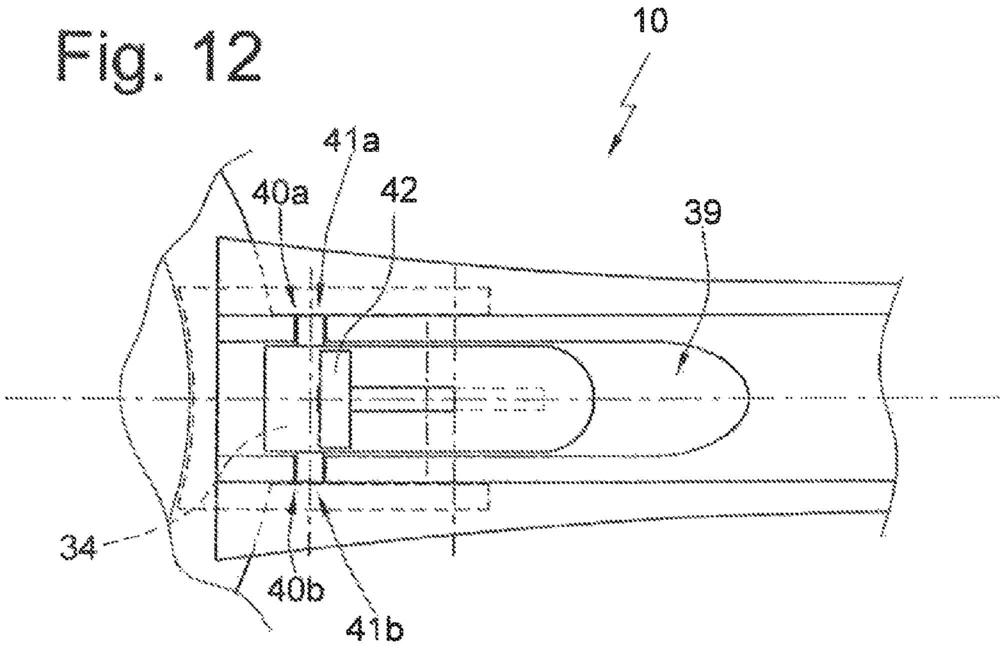
FIG. 12 shows a further exemplary embodiment of a handle element according to the invention, approximately in a representation in accordance with view arrow XII in FIG. 7, wherein the opening lever is of a different design as compared with the exemplary embodiment in FIG. 7.
Figure 13:
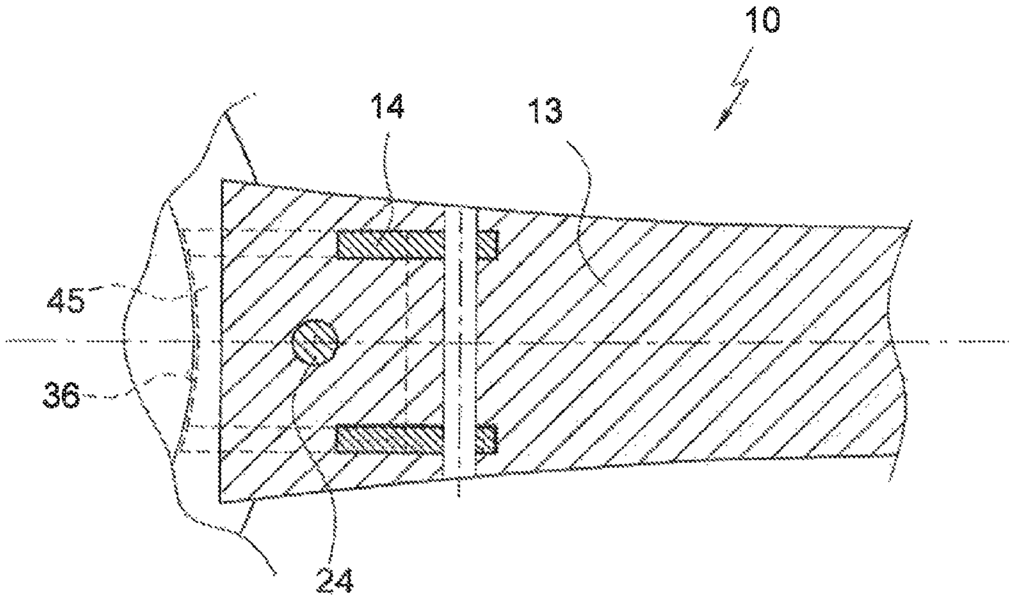
FIG. 13 shows a further exemplary embodiment of a handle element according to the invention in a representation approximately in accordance with section line XI-XIII in FIG. 7.

To this end, as is clear from the exemplary embodiments of FIGS. 11 and 12, a pair of retaining pins 41, **41*b* can be provided, which are integrally connected to the rotary bearing 34. These engage in corresponding slots 40*a*, 40*b* in a wall region of the support body 13 and are retained there axially. However, the axial retention of the rotary bearing 34 on the support body 13 permits a radial clearance of the pins 41, 41*b* with respect to the support body 13. The invention encompasses that the rotary bearing 34 can experience a certain lift relative to the abutment face 44 following a displacement movement of the closing lever 22. In other words, the retaining pins 41, 41*b* can slide in a vertical direction in relation to FIG. 5 in the slotted cutouts 40*a*, 40*b*. The closing lever 22 is thus mounted in an overhanging manner on the support body 13**.

The cam 25 has a cam face 26, which rolls along the abutment face 44. To prevent losses due to abrasion here, it is provided that, as shown in FIG. 10, the abutment face 44 is provided by a metal insert element 47.

Figure 10:
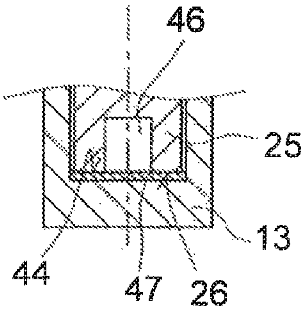
FIG. 10 shows in a schematic partial sectional representation, the handle element in the contact region between a control face of the control cam and a counter-control face, i.e., an abutment face of the support body.

FIG. 10 makes it clear that the cam face 26 and the abutment face 44 provide a pair of rolling faces or a pair of sliding faces. FIG. 10 also shows an cutout 46 in the cam 25, which permits the tie-rod 24 to pass through it.

An opening aid in the form of an opening lever 31 for the closing lever 22 when in the closed position will now be described in accordance with FIGS. 7 through 9:

The opening lever 1 is mounted on the closing lever 22 so as to be pivotable about a pivot axis 32. The opening lever 31 comprises an actuating lug 42, which can be easily grasped by an operator.

Let us assume that the handle element 10 in its closed state is attached to the cooking vessel 11. The actuating lug 42 can now easily be grasped by an operator and pivoted clockwise in relation to FIG. 7 about its pivot axis 32.

Figure 8:
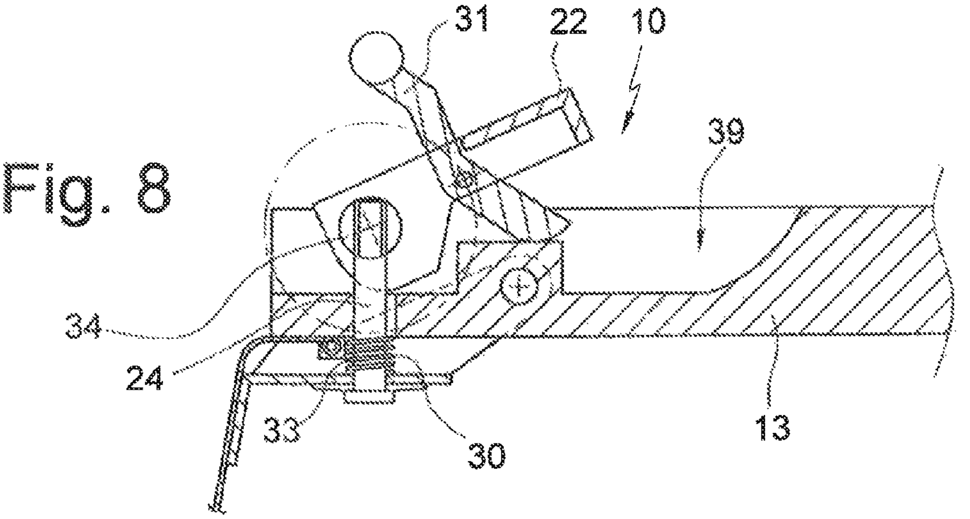
FIG. 8 shows the exemplary embodiment of FIG. 7 with the closing lever in an intermediate position.

In this process, the closing lever 22 is lifted slightly and transferred to a position as shown in FIG. 8. As the opening movement of the opening lever 31 continues and/or with the additional actuation of the closing lever 22 from the intermediate position as shown in FIG. 2 into its open position as shown in FIG. 9, the claw 14 can be transferred into its open state as shown in FIG. 9.

Figure 7:
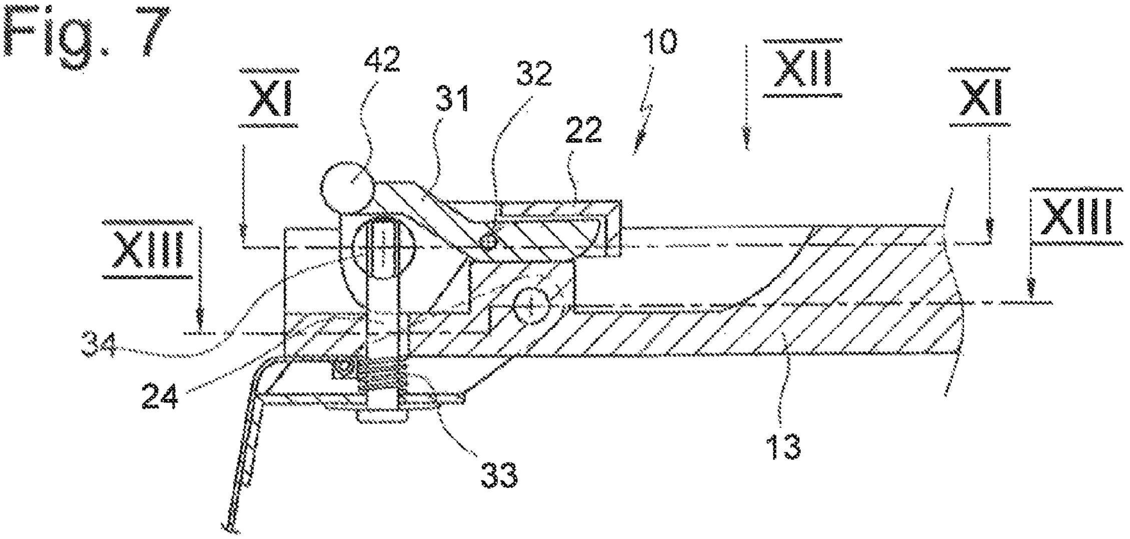
FIG. 7 shows a further exemplary embodiment of a handle element according to the invention in a representation comparable to FIG. 5, wherein an opening aid in the form of an opening lever is additionally provided.
Figure 9:
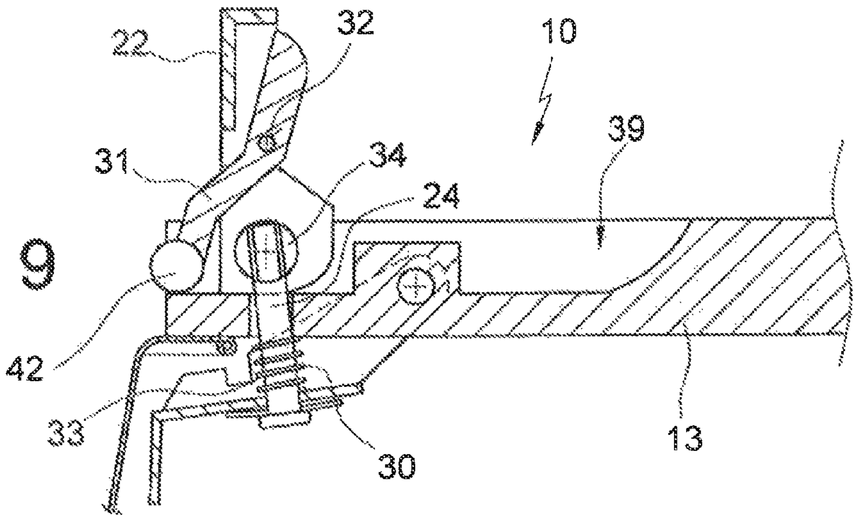
FIG. 9 shows the exemplary embodiment of FIG. 8 with the claw in the open position.

The opening lever 31 thus facilitates an opening, i.e., the performance of an opening movement, of the closing lever 22, from the closed position as shown in FIG. 7 to the open position as shown in FIG. 9.

In this case, the recessed grip shown in FIGS. 7 and 9 within the support body 13 can also be dispensed with in exemplary embodiments of the invention.

Figure 14:
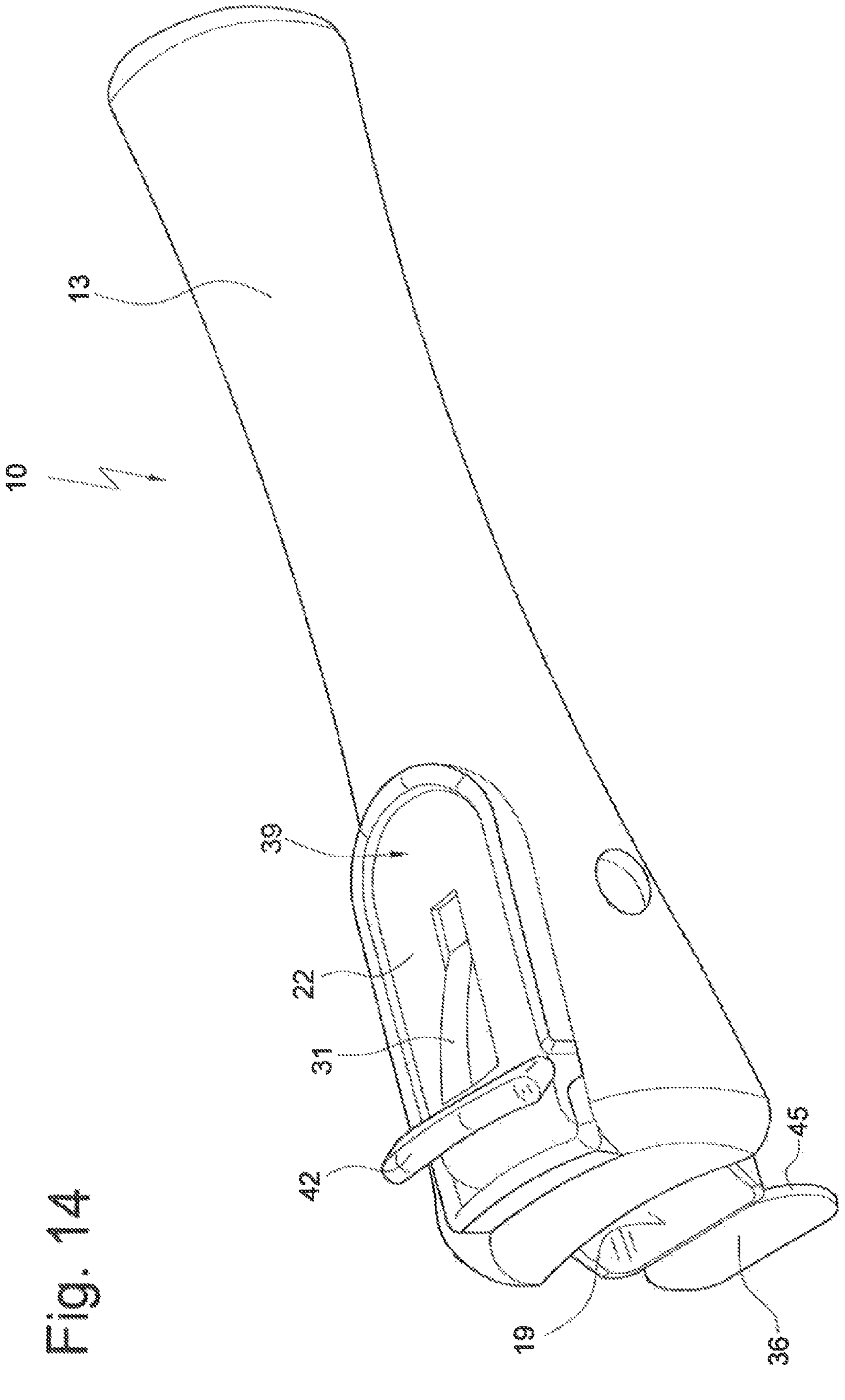
FIG. 14 shows a further exemplary embodiment of the handle element according to the invention in a simplified perspective view.

It should be noted that the exemplary embodiments of FIGS. 7 through 9 in a first variant, the exemplary embodiment of FIG. 12 in a second variant, and finally the exemplary embodiment of FIG. 14 in a third variant, show schematic views of different actuating extensions 42 of the opening lever 31.

The invention claimed is:

1. A handle element for releasable attachment to a cooking vessel, comprising: a support body: a claw provided by a single-arm lever and arranged on the support body; a clamping face pair having a first clamping face on the support body and a second clamping face on the claw, wherein the claw is pivotable between an open position, in which the two clamping faces are spaced apart from each other, and a closed position, in which the two clamping faces are closer together; and, a closing lever arranged on the support body, the closing lever being connected to the claw by a rod and comprising a cam which, as a result of a displacement of the closing lever from a non-usage position into a usage position, displaces the claw from the open position into the closed position.

2. The handle element according to claim 1, further comprising a spring element that biases the two clamping faces into the open position.

3. The handle element according to claim 2, wherein the spring element is arranged on or associated with the rod that connects the claw to the closing lever.

4. The handle element according to claim 3, wherein the spring element is a helical spring.

5. The handle element, in particular according to claim 1, wherein the support body and/or the closing lever is plastic.

6. The handle element according to claim 1, wherein the rod is mounted in a rotary bearing so as to be pivotable relative to the closing lever.

7. The handle element according to claim 6, wherein the rotary bearing is a metal rotary bearing.

8. The handle element according to claim 6, wherein the rotary bearing is retained axially in relation to the support body so as to provide a radial clearance.

9. The handle element according to claim 1, wherein the cam is plastic, wherein a metal counter-cam face is provided as an abutment for the cam.

10. The handle element according to claim 1, wherein the claw has an extension with an abutment face matched to a curvature of a wall of the cooking vessel.

11. The handle element according to claim 1, wherein the support body comprises a cutout in which the closing lever is received flush when in the usage position.

12. The handle element according to claim 1, wherein the rod abuts on the claw at a distance of more than two-thirds of a distance between a pivot axis of the claw and the second clamping face.

13. The handle element according to claim 1, wherein the closing lever is arranged in an overhanging manner on the support body.

14. The handle element according to claim 1, wherein the support body has a first side and a second side opposing the first side, the closing lever being arranged on the first side and the claw being arranged on the second side.

15. The handle element according to claim 1, wherein the support body has an opening through which the rod passes.

16. The handle element according to claim 1, wherein the cam has a cam surface that cooperates with a counter surface on the support body.

17. The handle element according to claim 1, wherein the claw has a pivot axis that is fixedly arranged relative to the support body.

18. The handle element according to claim 1, wherein the rod is arranged to transmit pulling forces.

19. A handle element for releasable attachment to a cooking vessel, a support body: a claw provided by a single-arm lever and arranged on the support body; a clamping face pair having a first clamping face on the support body and a second clamping face on the claw, wherein the claw is pivotable between an open position, in which the two clamping faces are spaced apart from each other, and a closed position, in which the two clamping faces are closer together; a closing mechanism comprising a closing lever that is actuateable to displace the claw from the open position into the closed position; and, an opening lever associated with the closing lever so as to initiate an opening movement of the closing lever.

20. The handle element, in particular according to claim 19, wherein the support body and/or the opening lever is plastic.

21. The handle element according to claim 19, wherein the opening lever is pivotably mounted on the closing lever.

* * * * *